US009448666B2

(12) United States Patent
Wilson et al.

(10) Patent No.: US 9,448,666 B2
(45) Date of Patent: Sep. 20, 2016

(54) DARK FILM LAMINATION FOR A TOUCH SENSOR

(71) Applicant: Microsoft Corporation, Redmond, WA (US)

(72) Inventors: Jason D. Wilson, West Linn, OR (US); Mark Green, Newberg, OR (US); Bill Emery, Sherwood, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 13/913,393

(22) Filed: Jun. 8, 2013

(65) Prior Publication Data

US 2014/0362050 A1    Dec. 11, 2014

(51) Int. Cl.
*H04L 12/10* (2006.01)
*G02F 1/1345* (2006.01)
*G06F 3/042* (2006.01)
*G06F 3/044* (2006.01)
*B32B 7/12* (2006.01)

(52) U.S. Cl.
CPC .............. *G06F 3/042* (2013.01); *B32B 7/12* (2013.01); *G06F 3/044* (2013.01); *B32B 2255/205* (2013.01); *B32B 2457/208* (2013.01); *G06F 2203/04103* (2013.01); *Y10T 156/10* (2015.01)

(58) Field of Classification Search
CPC .............. G06F 3/041; G06F 2203/04103; G06F 3/045; G06F 3/1279; G02B 1/10; C03C 27/00; H01L 2924/00; G02F 1/13452; G02F 2001/13456; G02F 1/13458; H05K 1/147; H05K 3/361; H05K 2201/09472; H04L 12/10
USPC ................. 174/250; 438/34; 427/97.4, 96.1; 428/544–568
See application file for complete search history.

(56) References Cited

U.S. PATENT DOCUMENTS 6,354,595 B1 * 3/2002 Vieux et al. ................. 277/312
8,049,333 B2   11/2011 Alden et al.
(Continued)

FOREIGN PATENT DOCUMENTS

EP     2 584 437 A2     4/2013
WO   WO 2013/048122    * 4/2013

OTHER PUBLICATIONS

International Search Report and Written Opinion for PCT/US2014/040171 mailed Sep. 24, 2014.
(Continued)

*Primary Examiner* — Temesgh Ghebretinsae
*Assistant Examiner* — Paras D Karki
(74) *Attorney, Agent, or Firm* — Brandon Roper; Judy Yee; Micky Minhas

(57) ABSTRACT

Different lamination methods may be used to create a touch sensor with a darkened side of metalized film facing the user. One lamination method includes laminating a metalized film to an optically clear adhesive (OCA) layer such that an edge of the metalized film including the termination pads remain un-adhered to the OCA layer. Flex-tails may be bonded to the termination pads at a later time by bending up the un-adhered edge. Anisotropic Conductive Film (ACF) may be placed on the termination pads prior to laminating the metalized films. Flex-tails may be placed onto an OCA layer in a location where the termination pads on the metalized film will be located when laminated to the OCA layer. A strip of ACF may be placed on the flex-tail pads. The flex-tails may be bonded to the termination pads of the metalized film prior to the metalized film being laminated.

14 Claims, 25 Drawing Sheets

(56) References Cited

U.S. PATENT DOCUMENTS

| | | |
|---|---|---|
| 8,209,861 B2 | 7/2012 | Long et al. |
| 8,284,332 B2 | 10/2012 | Geaghan et al. |
| 2008/0165158 A1* | 7/2008 | Hotelling et al. ............ 345/174 |
| 2009/0104572 A1 | 4/2009 | Gao et al. |
| 2009/0205879 A1 | 8/2009 | Halsey, IV et al. |
| 2009/0283300 A1 | 11/2009 | Grunthaner |
| 2010/0123675 A1 | 5/2010 | Ippel |
| 2011/0279398 A1* | 11/2011 | Philipp ........................ 345/174 |
| 2011/0310037 A1 | 12/2011 | Moran et al. |
| 2012/0019475 A1 | 1/2012 | Li et al. |
| 2012/0194481 A1 | 8/2012 | Frey et al. |
| 2012/0223049 A1 | 9/2012 | Yoshikawa et al. |
| 2013/0016065 A1* | 1/2013 | Reynolds et al. ............ 345/174 |
| 2013/0140065 A1 | 6/2013 | Koo et al. |
| 2014/0247406 A1* | 9/2014 | Park ............................... 349/12 |

OTHER PUBLICATIONS

"Second Written Opinion Issued in PCT Patent Application No. PCT/US2014/040171", Mailed Date: May 15, 2015, 7 Pages.

"International Preliminary Report on Patentability Issued in PCT Patent Application No. PCT/US2014/040171", Mailed Date: Aug. 31, 2015, 8 Pages.

* cited by examiner

DARK FILM LAMINATION FOR A TOUCH SENSOR

BACKGROUND

Some film-based, metal conductor touch sensors have a darkening coating on the side of the conductors which is open to air (the non-film side). Film-based sensors are often built onto a glass substrate. A metalized touch metalized film layer during lamination is oriented with the metalized layer facing away from the user so that the termination pads remain accessible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A touch sensor is constructed to have a darkening coating that is on the side of the metalized film facing the user (e.g. a glass touch surface). One or more metalized films may be used within the touch sensor (e.g. a row film and a column film, a grid film, and the like). Different lamination methods may be used to construct the touch sensor with the darkened side of the film facing the user. One lamination method includes laminating a metalized film to an optically clear adhesive (OCA) layer such that an edge of the metalized film including the termination pads remain un-adhered to the OCA layer. The un-adhered edges of the metalized film are bent such that flex-tails (e.g. with anisotropic conductive film (ACF)) may be inserted between an OCA layer and the metalized film and aligned under the termination pads of the metalized film. The separate layers may then be bonded more fully (e.g. pressure/heat applied) to help ensure a good bond between the flex-tails, ACF, and the termination pads of the metalized film. Another lamination method includes placing ACF on the termination pads prior to laminating the metalized films. Yet another lamination method includes placing flex-tails down onto an OCA layer in a location where the termination pads on the metalized film will be located when laminated to the OCA layer. A strip of ACF may be placed on the flex-tail pads. The metalized film is aligned and laminated such that the termination pads of the metalized film are on top of the ACF/flex-tail pads. Another lamination method includes attaching the flex-tails to the termination pads of the metalized film prior to the metalized film being laminated. In this way, the metalized film may be tested (e.g. electrical continuity) before it is laminated to the touch surface.

DETAILED DESCRIPTION

Figure 1:
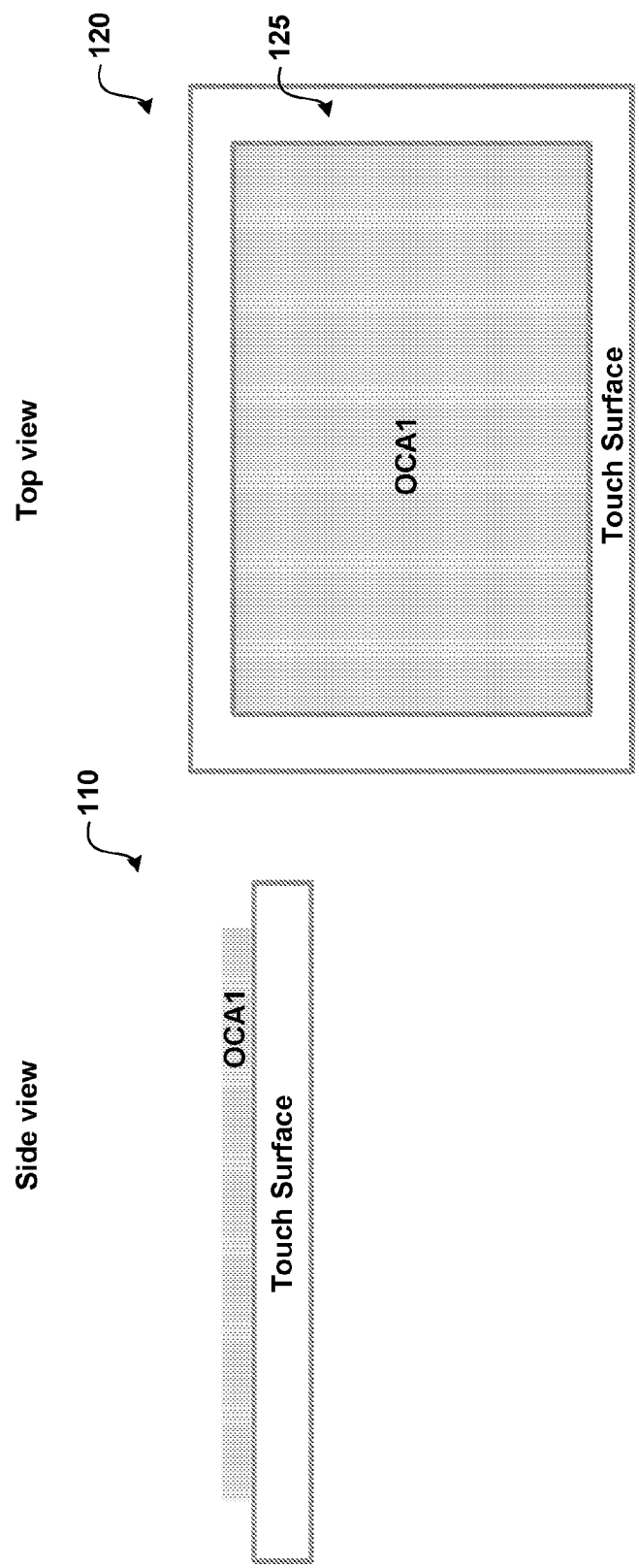
FIG. 1 shows an Optically Clear Adhesive (OCA) layer laminated to a touch surface.

According to an embodiment, touch sensor embodiments described herein use projected capacitive technology (PCT). Other technologies may be used in accordance with embodiments of the invention. While the figures generally show two different layers of metalized film (e.g. row film and column film), fewer/more metalized film layers may be used. Generally, each metalized film layer includes conductive material arranged in a pattern (e.g. rows, columns, diamond pattern, grid pattern . . . ). According to an embodiment, the row film includes parallel lines of conductive material arranged in rows and the column film includes parallel lines of conductive material arranged in columns. Some film-based, metal conductor touch sensors include a darkening coating on one side of the film (e.g. the side of the conductors which is open to air). Embodiments described herein include the use of film-based sensors (e.g. row film, column film) that are built onto a glass substrate, where the sheet of glass is the touch surface that the user interacts with. Using previous lamination methods, the film was laminated with the darkened surface facing away from the user such that the termination pads on the film remained accessible and able to be attached to flex-tails. As such, the non-darkened side of the film faced the user instead of having the darkened side of the film facing the user. Having the darkened surface facing the user may help hide the conductive material from being able to be seen when looking through the glass. The following embodiments illustrate touch sensors and method of laminating layers of a touch sensor to have the darkening coating on the side of the film that faces the user (e.g. a glass touch surface).

Referring now to the drawings, in which like numerals represent like elements, various embodiment will be described.

FIG. 1 shows an Optically Clear Adhesive (OCA) layer laminated to a touch surface.

As illustrated, side view 110 shows an Optically Clear Adhesive (OCA) layer laminated to a touch surface. The touch surface may be made from different materials. According to an embodiment, the touch surface is glass. While an OCA layer is shown, other products, such as other types of adhesives may be used. The OCA layer may be a liquid OCA and/or an OCA tape. The OCA may be different thicknesses (e.g. 50 microns to 250 microns, or other thicknesses) depending on the application. The touch surface may be different thicknesses (e.g. depending on the application and/or type of device). For example, a glass touch surface may range from approximately 0.5 mm to over 3 mm depending on the application.

Top view 120 shows that the OCA layer is sized smaller as compared to the touch surface. As illustrated, a border 125 is shown that leaves a portion of the touch surface not covered by the OCA.

Figure 2:
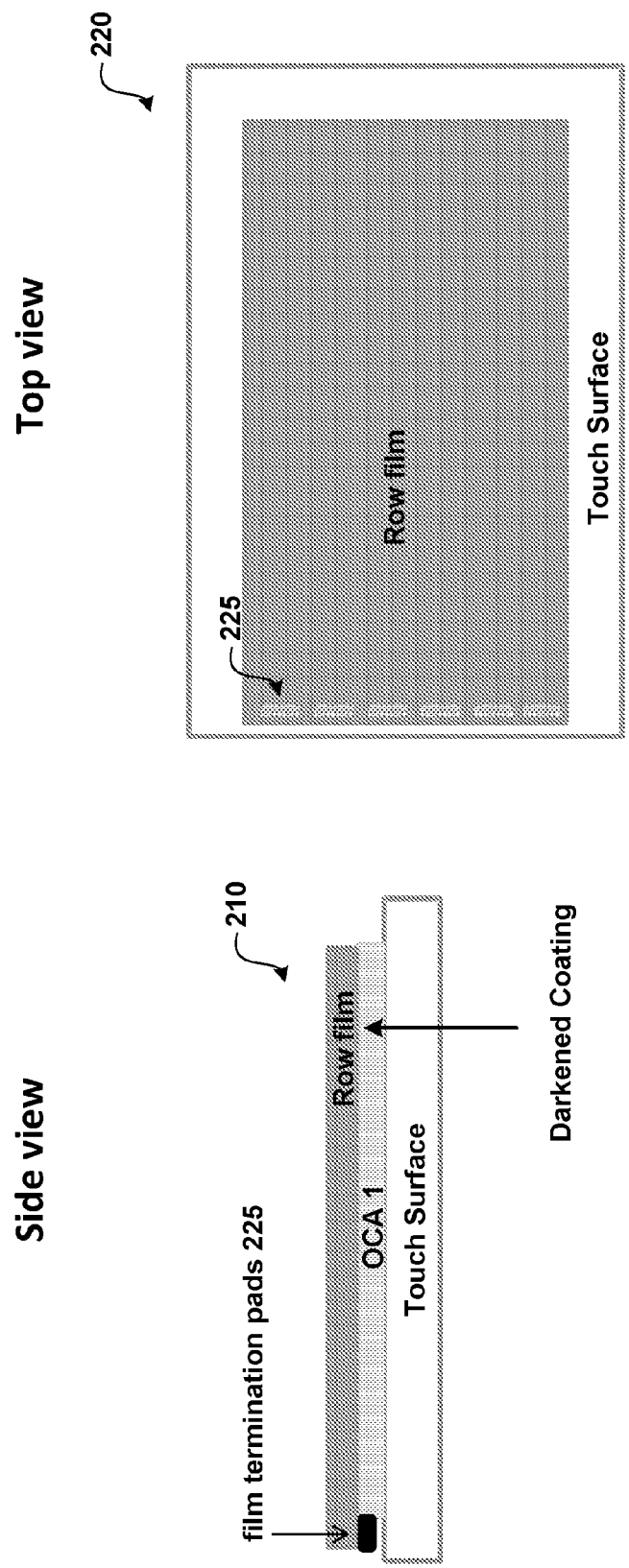
FIG. 2 illustrates a row film laminated to an OCA layer.

FIG. 2 illustrates a row film laminated to an OCA layer.

As illustrated, side view 210 shows row film 212 including termination pads 225 disposed on an end of row film 225 that is laminated to OCA1. According to an embodiment, the thickness of the row film is approximately between 75 microns and 250 microns and the row film may be bendable. Different types of metalized film may be used. For example, different patterns of conductive material may be arranged in one or more metalized film layers. According to an embodiment, the row film includes conductive material arranged in parallel rows (e.g. 2 wires on a 6.5 mm pitch) across the row film. A darkened coating is on a side of the row film facing the touch surface and on the side of the metalized film where the termination pads 225 are bonded to flex-tails (See Figures and Related description below). As can be seen, the side of the row film including the darkened coating is facing the glass of the touch surface (e.g. the user).

Top view 120 shows that the row film covers the OCA1 layer. As illustrated, termination pads 225 are disposed near the left end of row film. The termination pads may be located in other positions (e.g. near the right end of the row film).

Figure 3:
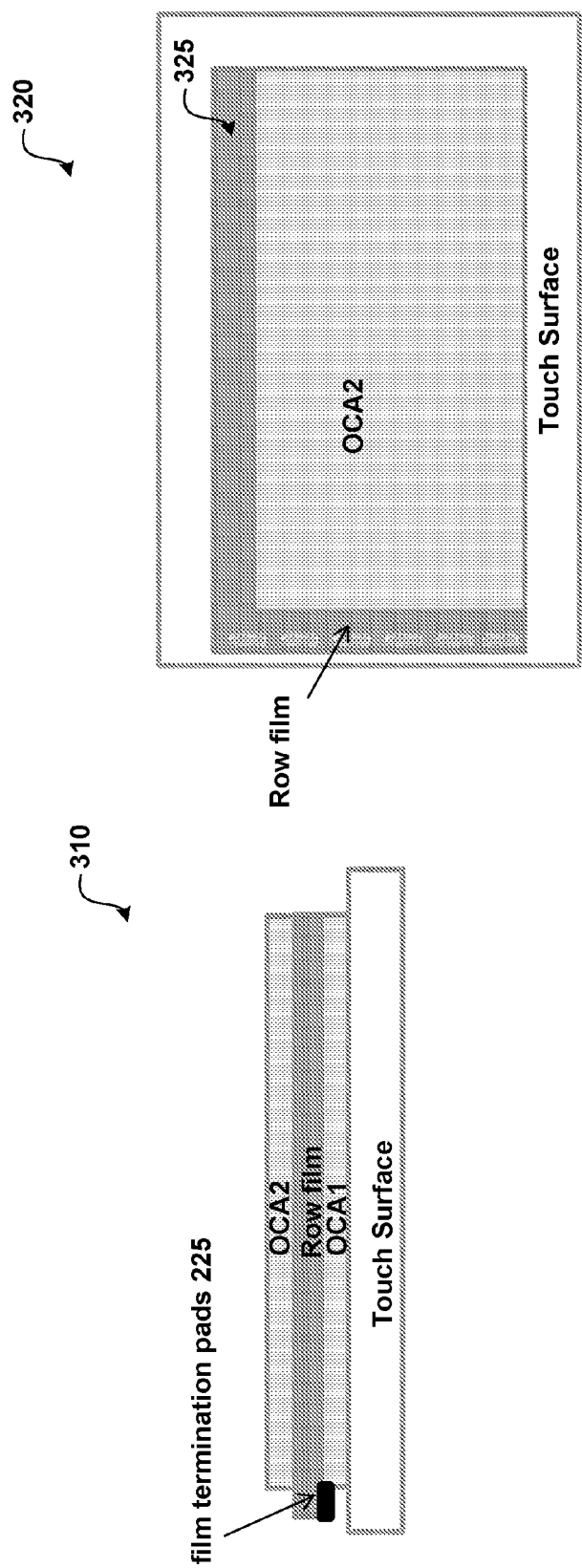
FIG. 3 shows an OCA layer laminated to the row film.

FIG. 3 shows an OCA layer laminated to the row film.

As illustrated, side view 310 shows a second OCA layer (OCA2) laminated to row film 212.

Top view 320 shows that the second OCA2 layer is sized smaller as compared to the row film surface. As illustrated, a border 325 is shown that leaves a portion of the touch surface not covered by the OCA2 layer.

Figure 4:
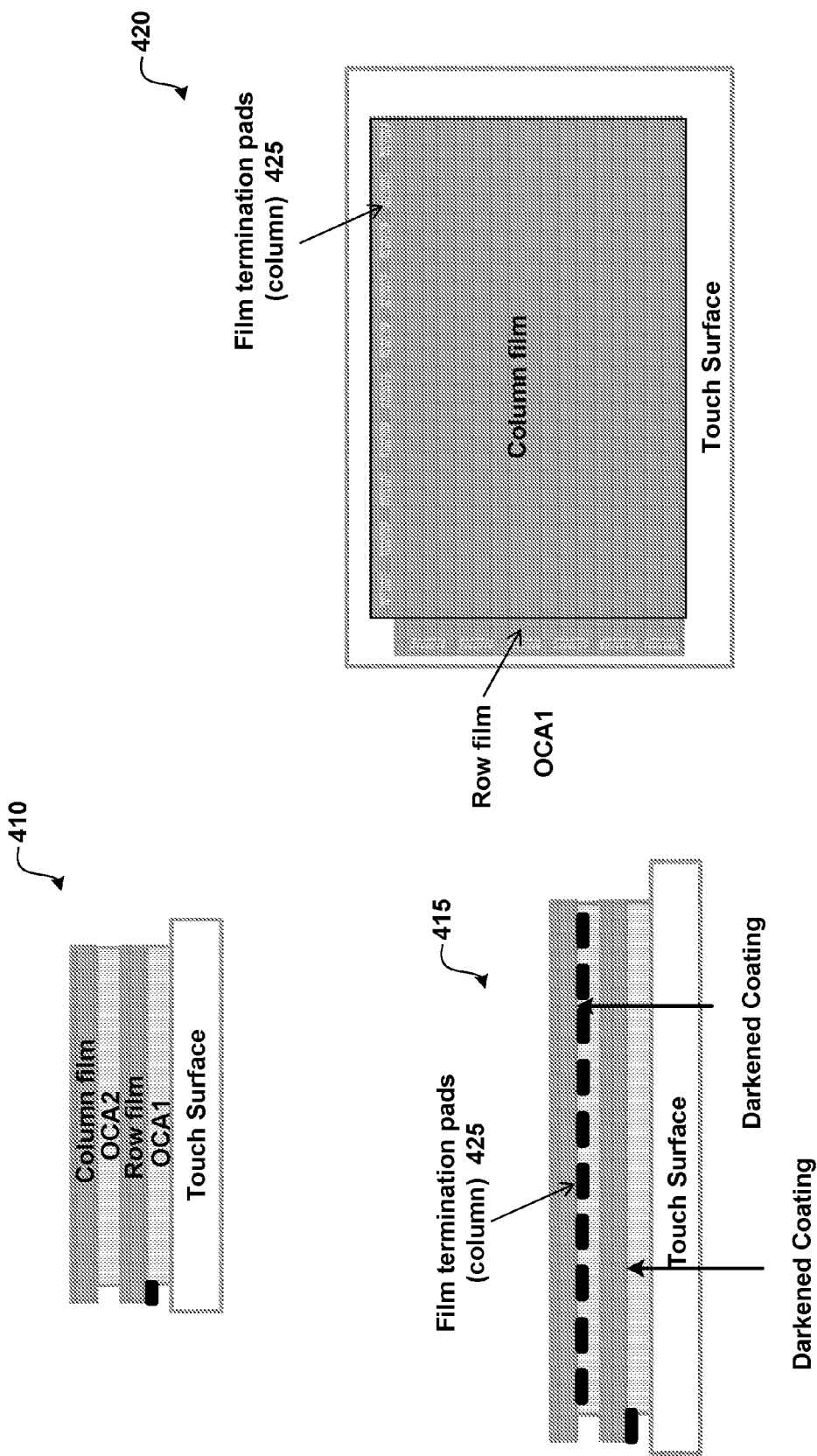
FIG. 4 illustrates a column film laminated to an OCA layer.

FIG. 4 illustrates a column film laminated to an OCA layer.

As illustrated, side view 410 shows column film including disposed on an end of column film that is laminated to OCA2. According to an embodiment, the column film includes conductive material arranged in parallel columns down the column film. A darkened coating is on a side of the column film facing the touch surface and on the side of the metalized film where the termination pads 425 are bonded to flex-tails. As can be seen, the side of the column film including the darkened coating is facing the glass of the touch surface (e.g. the user).

Side view 415 shows the column film including termination pads 425 disposed on an end of column film that is laminated to the OCA2.

Top view 420 shows that the column film 412 covers the OCA2 layer. As illustrated, termination pads 425 are disposed near the top end of column film. The termination pads may be located in other positions (e.g. near the bottom end of the row film).

Figure 5:
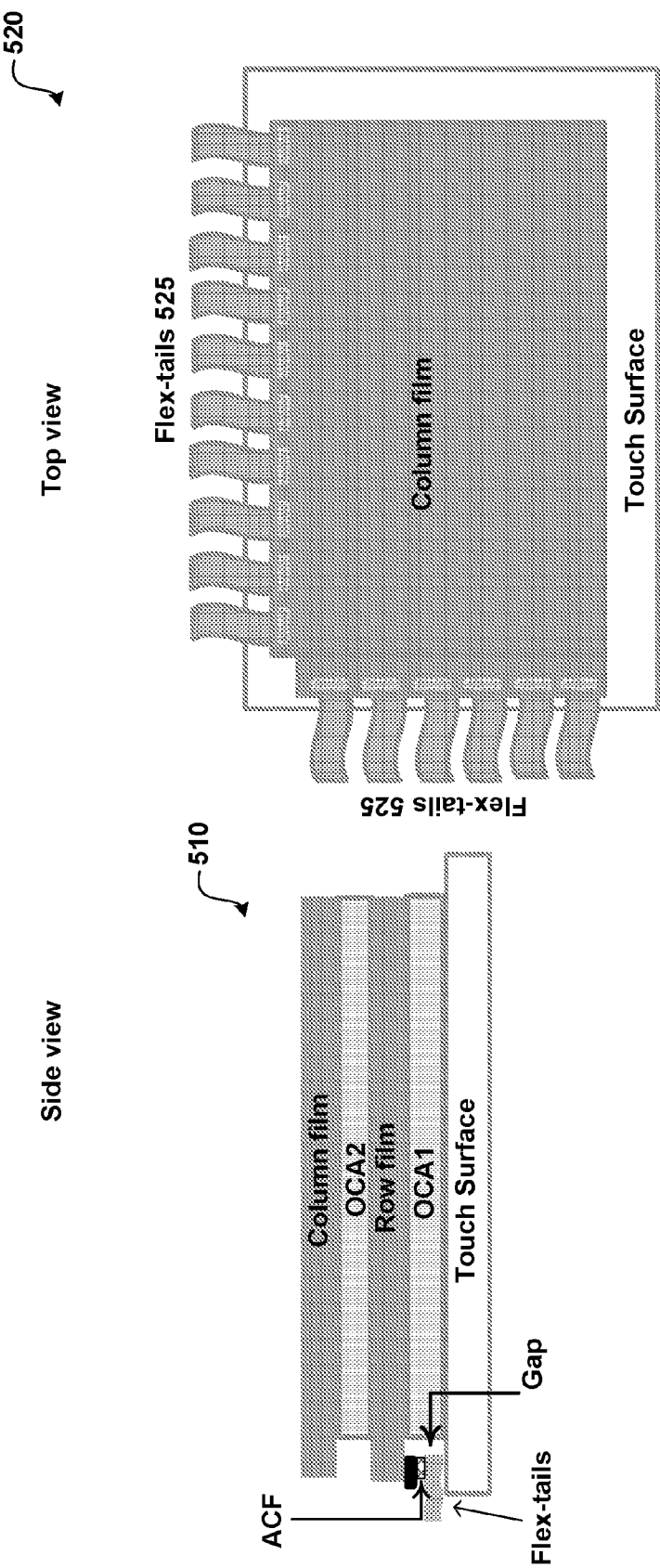
FIG. 5 shows flex-tails aligned and bonded into place on the row film and the column film.

FIG. 5 shows flex-tails aligned and bonded into place on the row film and the column film.

As illustrated, the non-adhered edges of the films (row film and column film) are peeled up and flex-tails with anisotropic conductive film (ACF) on their pads are aligned and bonded into place. Generally, ACF is an adhesive with metal balls embedded in it such that it is conductive in the z-axis and not in the x or y axis. According to an embodiment, the ACF is the 3M™ Electrically Conductive Adhesive Transfer Tape 9703 that is part of a family of anisotropic (Z-Axis) conductive tapes and thermoset films.

Figure 6:
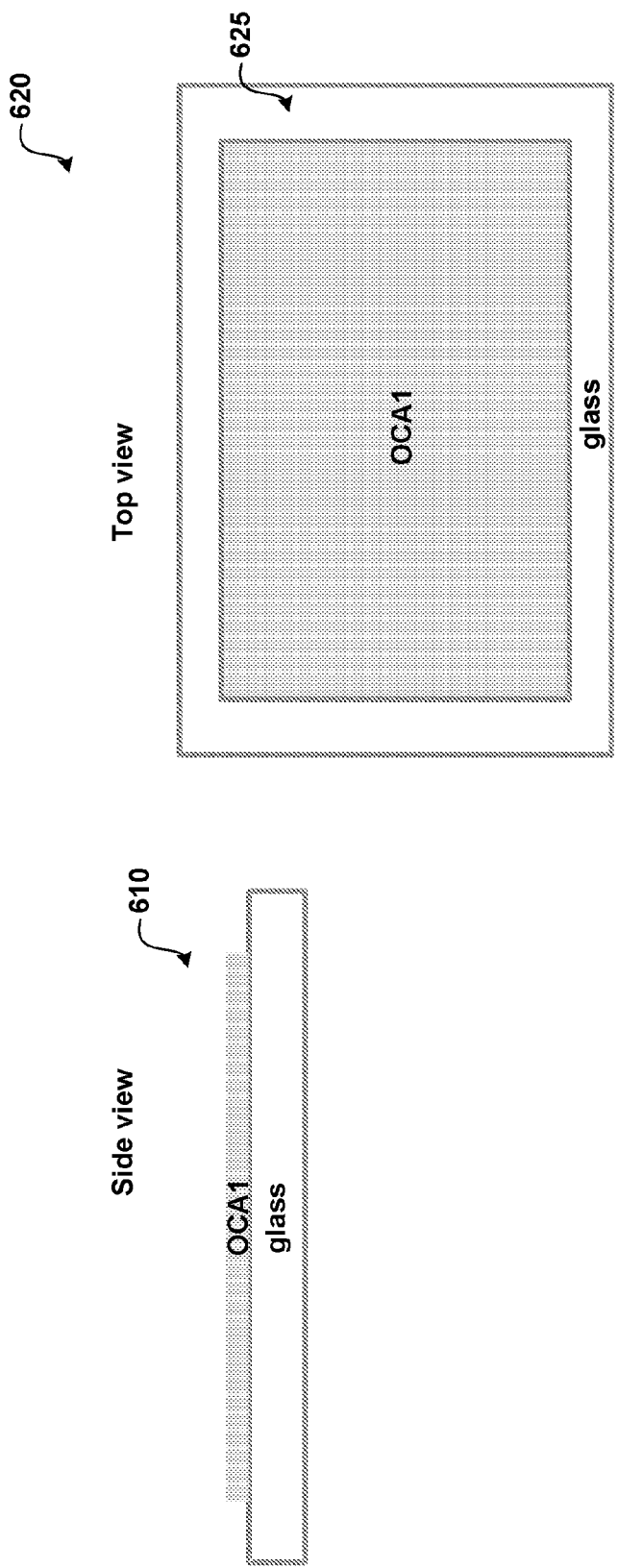
FIG. 6 illustrates an Optically Clear Adhesive (OCA) layer laminated to a touch surface.

FIG. 6 illustrates an Optically Clear Adhesive (OCA) layer laminated to a touch surface.

As illustrated, side view 610 shows an Optically Clear Adhesive (OCA) layer laminated to a glass touch surface. The touch surface may be made from different materials.

Top view 620 shows that the OCA layer is sized smaller as compared to the touch surface. As illustrated, a border 625 is shown that leaves a portion of the touch surface not covered by the OCA.

Figure 7:
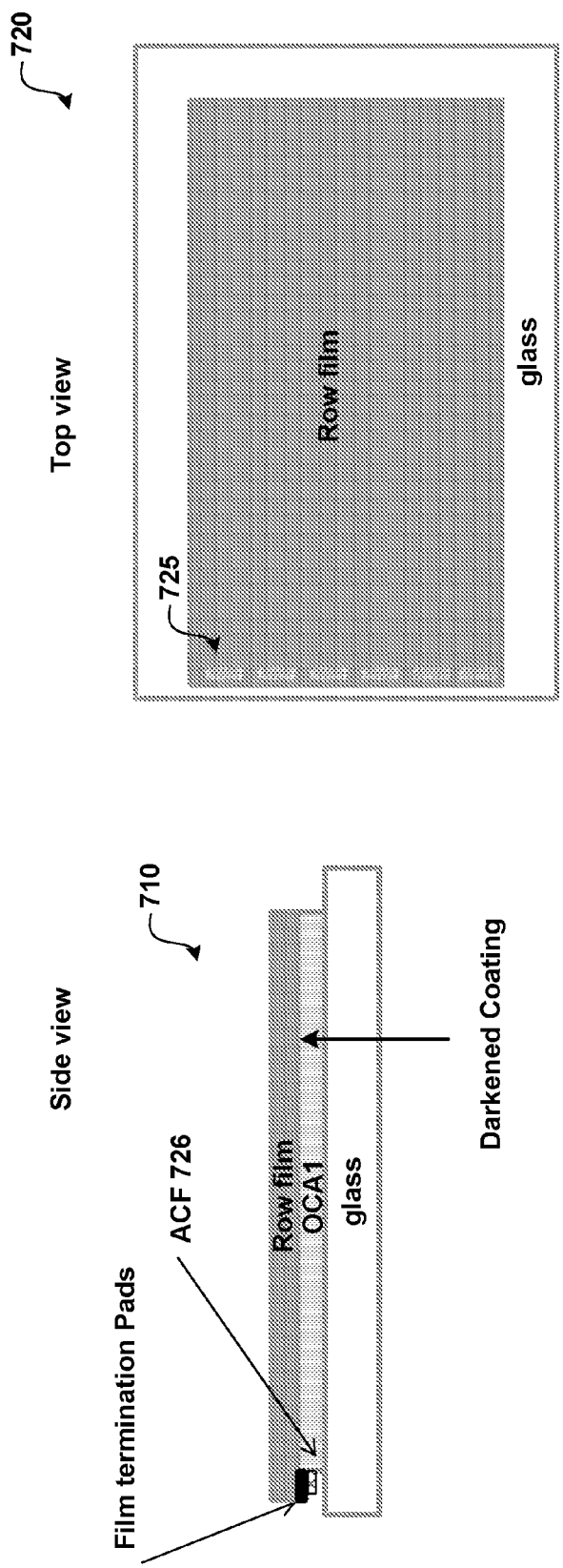
FIG. 7 shows a row film laminated to an OCA layer after Anisotropic Conductive Film (ACF) is placed over row film termination pads.

FIG. 7 shows a row film laminated to an OCA layer after Anisotropic Conductive Film (ACF) is placed over row film termination pads.

As illustrated, side view 710 shows row film including termination pads 725 disposed on an end of the row film that is laminated to OCA1. As can be seen, the side of the row film including the darkened coating is facing the glass of the touch surface (e.g. the user).

Top view 720 shows that the row film covers the OCA layer. As illustrated, termination pads 725 are disposed near the left end of row film. The termination pads may be located in other positions (e.g. near the right end of the row film). Prior to laminating the row film to OCA1, a strip of ACF 726 is placed down over the row film termination pads. The row film is laminated to OCA1 such that the termination pads 725 on one end of the film are exposed and not laminated.

Figure 8:
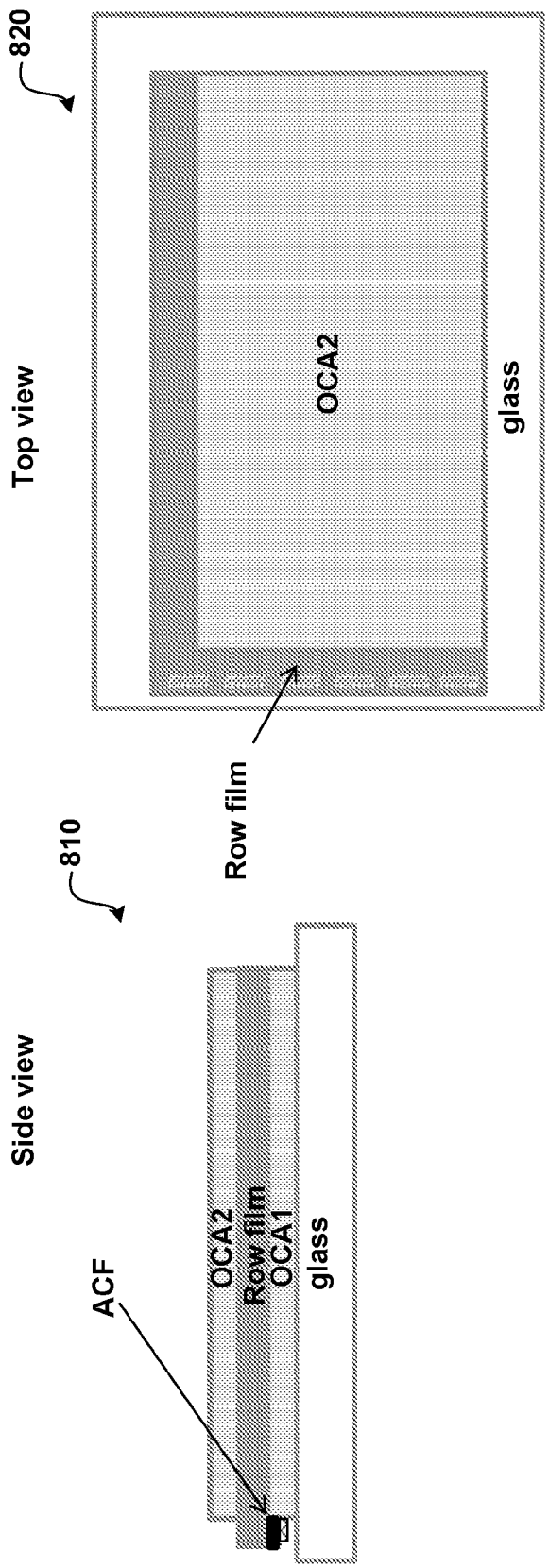
FIG. 8 illustrates an OCA layer laminated to the row film.

FIG. 8 illustrates an OCA layer laminated to the row film.

As illustrated, side view 810 shows a second OCA layer (OCA2) laminated to row film 212.

Top view 820 shows that the second OCA layer is sized smaller as compared to the row film surface. As illustrated, a border 325 is shown that leaves a portion of the touch surface not covered by the OCA.

Figure 9:
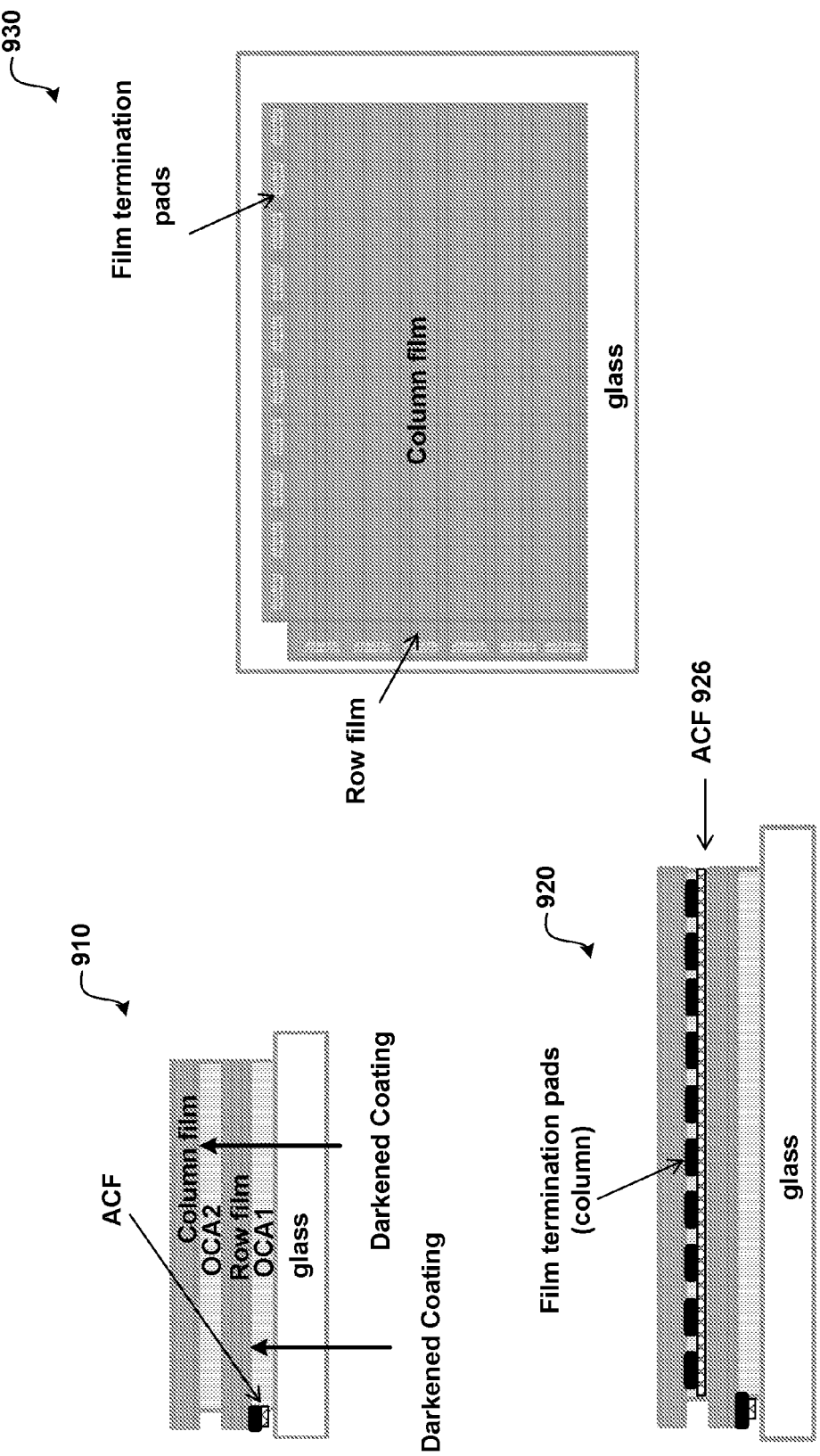
FIG. 9 shows a column film laminated to an OCA layer after Anisotropic Conductive Film (ACF) is placed over column film termination pads.

FIG. 9 shows a column film laminated to an OCA layer after Anisotropic Conductive Film (ACF) is placed over column film termination pads.

As illustrated, side view 910 and side view 920 show the overlap of the row film over the OCA1 layer and the column film over the OCA2 layer. Prior to laminating the column film to OCA2, a strip of ACF 926 is placed down over the column film termination pads. The column film is laminated to OCA2 such that the termination pads on one end of the column film are exposed and not laminated. As can be seen, the side of the film including the darkened coating is facing the glass of the touch surface (e.g. the user).

Top view 920 shows that the column film covers the OCA2 layer. As illustrated, film termination pads are disposed near the top end of column film. The termination pads may be located in other positions (e.g. near the bottom end of the column film).

Figure 10:
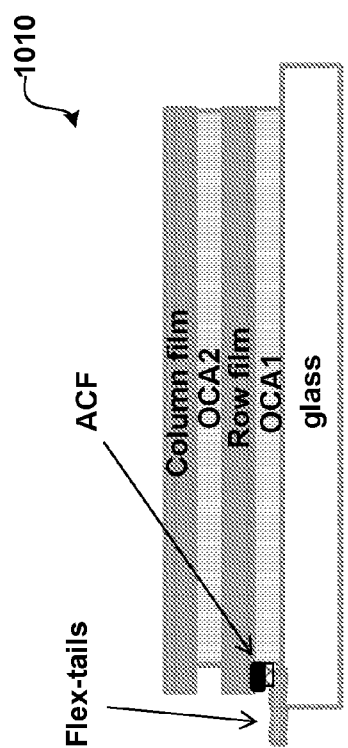
FIG. 10 illustrates flex-tails aligned and bonded into place on the row film and the column film using the ACF.
Figure 10:
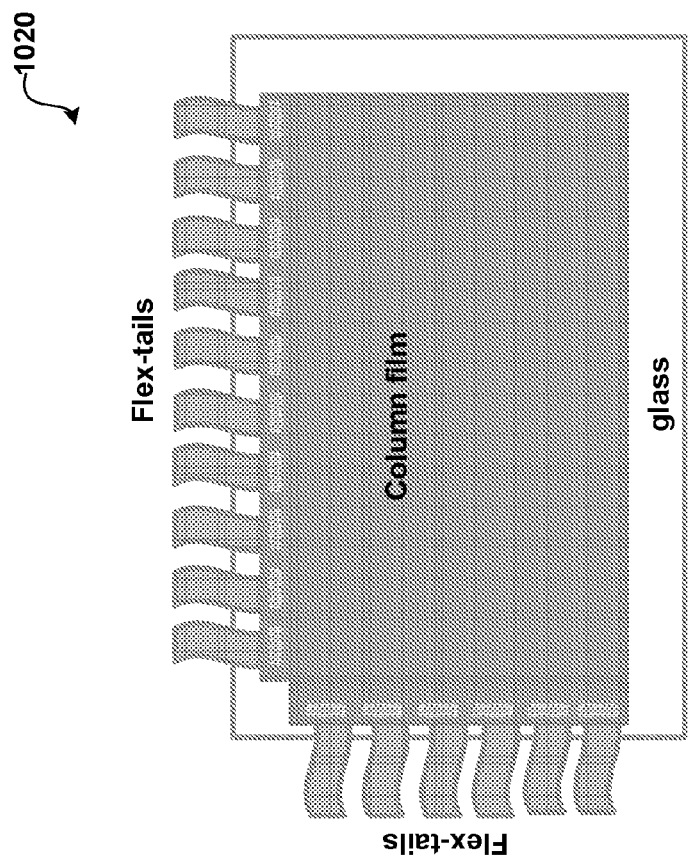

FIG. 10 illustrates flex-tails aligned and bonded into place on the row film and the column film using the ACF.

As illustrated, the non-adhered edges of the films (row film and column film) are peeled up and flex-tails with anisotropic conductive film (ACF) on their pads are aligned and bonded into place.

Figure 11:
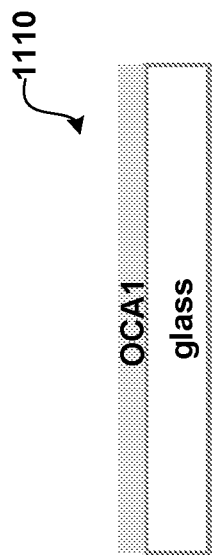
FIG. 11 shows an Optically Clear Adhesive (OCA) layer laminated to a touch surface.
Figure 11:
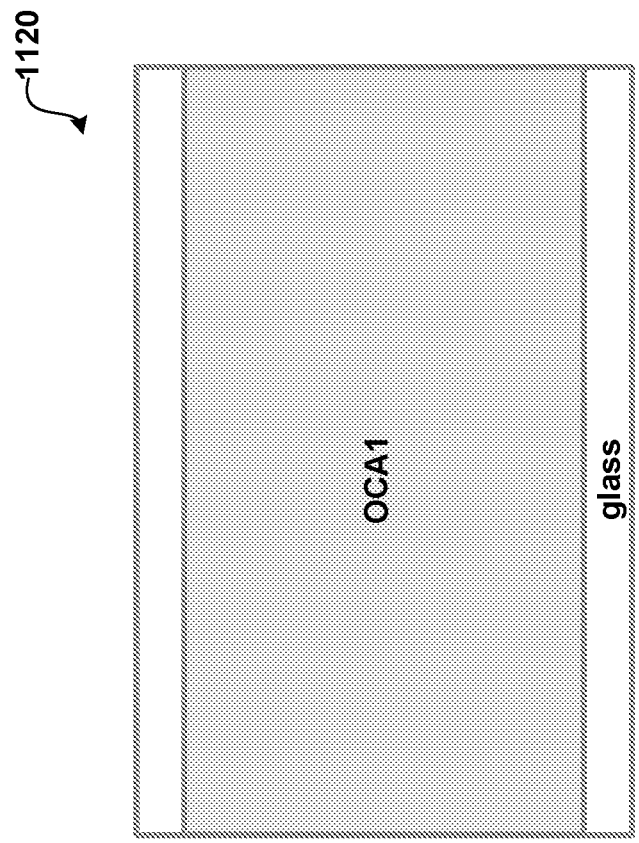

FIG. 11 shows an Optically Clear Adhesive (OCA) layer laminated to a touch surface.

As illustrated, side view 1100 shows an Optically Clear Adhesive (OCA) layer laminated to a glass touch surface. The touch surface may be made from different materials.

Top view 920 shows that the OCA layer is sized slightly smaller as compared to the touch surface. Other sizes may be chosen. As illustrated, a border at the top and bottom of the touch surface is not covered by the OCA1 layer.

Figure 12:
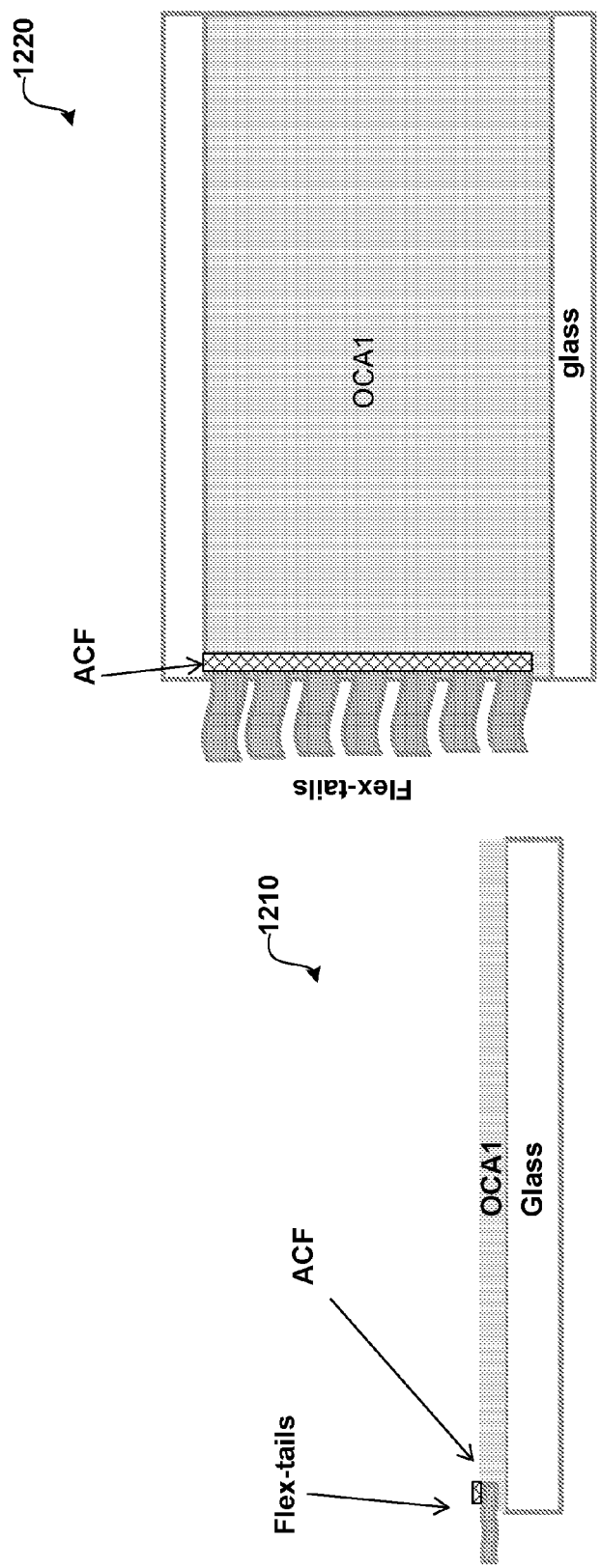
FIG. 12 illustrates flex-tails aligned with Anisotropic Conductive Film (ACF) on the pads aligned and bonded onto the OCA.

FIG. 12 illustrates flex-tails aligned with Anisotropic Conductive Film (ACF) on the pads aligned and bonded onto the OCA.

Side view 1210 shows flex-tails with anisotropic conductive film (ACF) on their pads aligned and bonded into place onto the OCA1 layer.

Top view 1220 shows flex-tails having a strip of ACF on the termination pads aligned and bonded into place onto the OCA1 layer.

Figure 13:
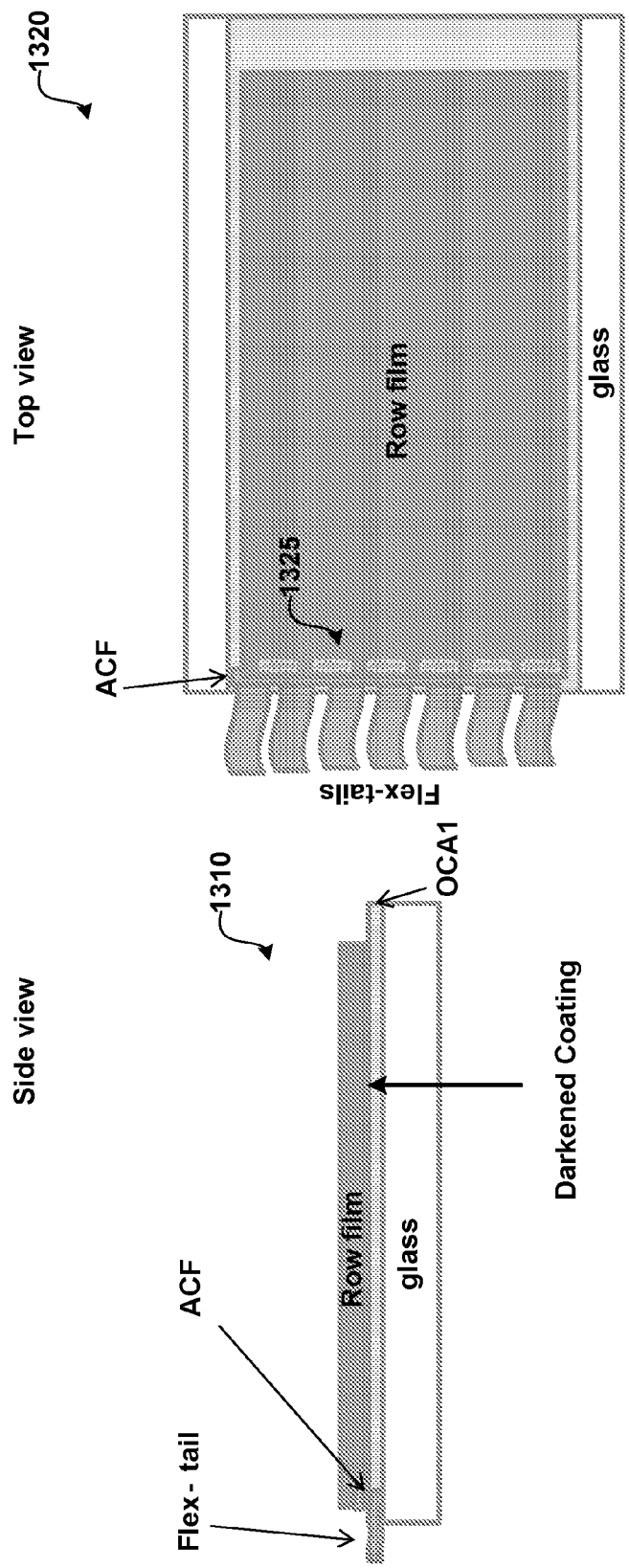
FIG. 13 shows row film laminated to the OCA layer so that termination pads on one end of the row film are bonded on top of the ACF on the flex-tails.

FIG. 13 shows row film laminated to the OCA layer so that termination pads on one end of the row film are bonded on top of the ACF on the flex-tails.

Side view 1310 shows a row film laminated over the OCA1 layer such that the termination pads on the row film are bonded on top of the ACF on the flex-tails. As can be seen, the side of the film including the darkened coating is facing the glass of the touch surface (e.g. the user).

Top view 1320 shows a row film laminated over the OCA1 layer such that the termination pads 1325 on the row film are bonded on top of the ACF on the flex-tails.

Figure 14:
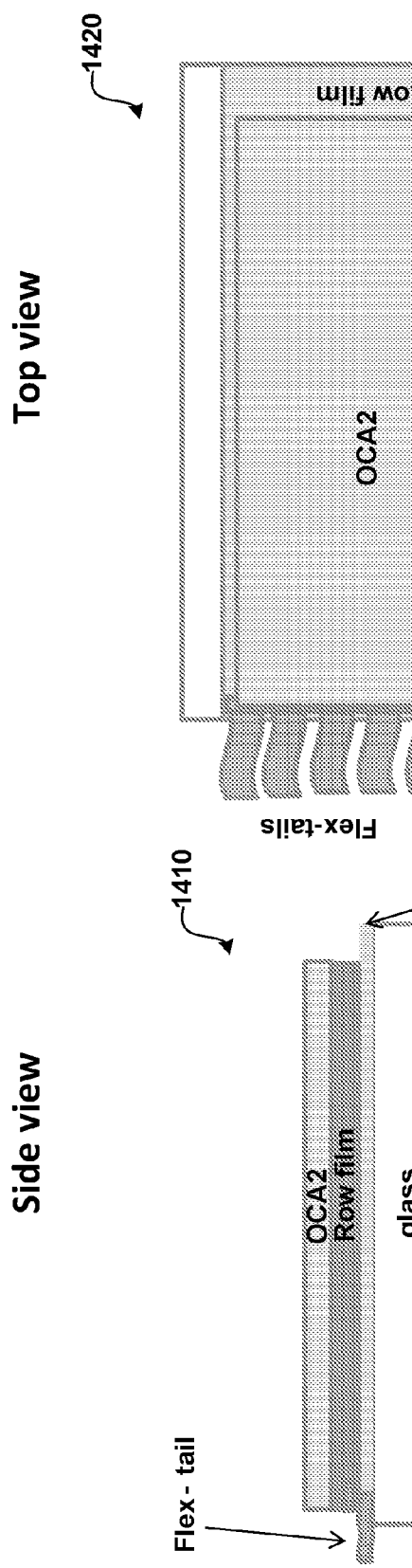
FIG. 14 illustrates an Optically Clear Adhesive (OCA) layer laminated to the row film.

FIG. 14 illustrates an Optically Clear Adhesive (OCA) layer laminated to the row film.

As illustrated, side view 1410 shows a second OCA layer (OCA2) laminated to the row film.

Top view 1420 shows that the OCA2 layer is sized smaller as compared to the row film surface but covers the flex tails and termination pads of the row film. As illustrated, a small border is shown that leaves a portion of the row film not covered by the OCA.

Figure 15:
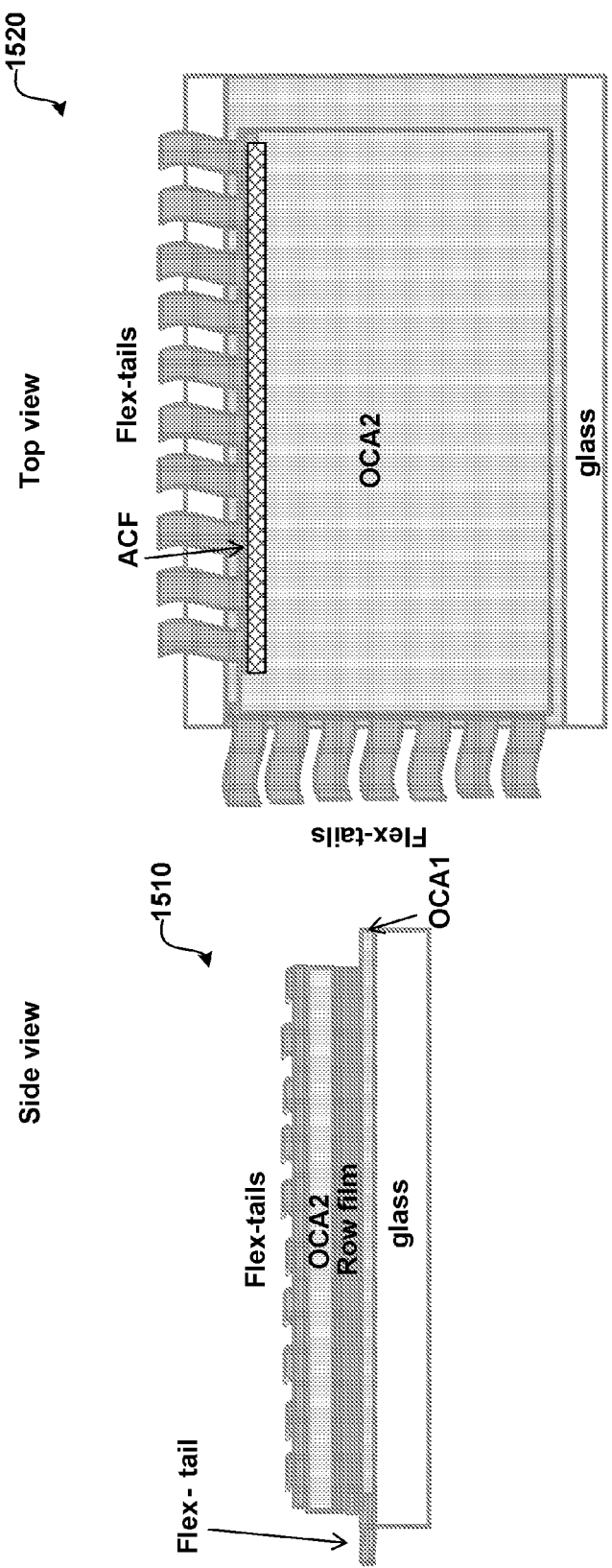
FIG. 15 shows flex-tails aligned with Anisotropic Conductive Film (ACF) on the pads aligned and bonded onto the OCA.

FIG. 15 shows flex-tails aligned with Anisotropic Conductive Film (ACF) on the pads aligned and bonded onto the OCA.

Side view 1510 shows flex-tails with anisotropic conductive film (ACF) on their pads aligned and bonded into place onto the OCA2 layer.

Top view 1520 shows flex-tails having a strip of ACF on the termination pads aligned and bonded into place onto the OCA2 layer.

Figure 16:
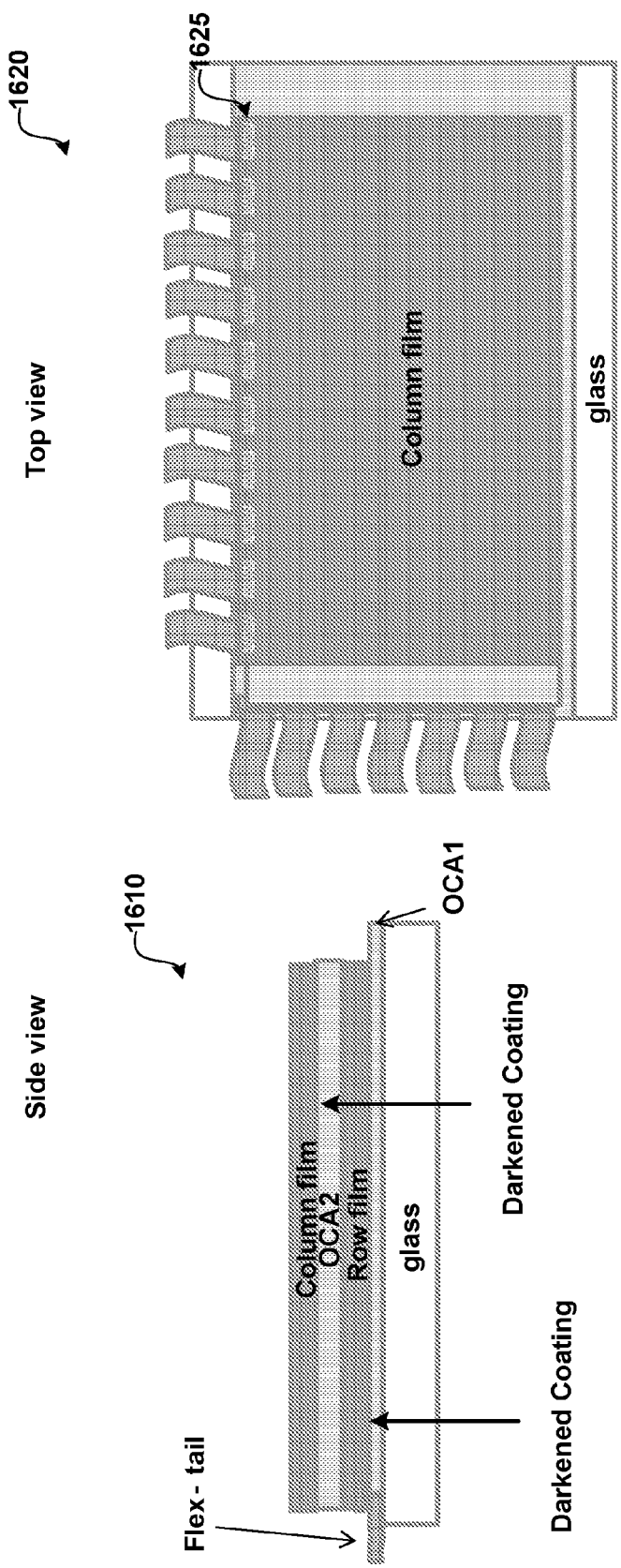
FIG. 16 illustrates column film laminated to the OCA layer so that termination pads on one end of the column film are bonded on top of the ACF on the flex-tails.

FIG. 16 illustrates column film laminated to the OCA layer so that termination pads on one end of the column film are bonded on top of the ACF on the flex-tails.

Side view 1610 shows a column film laminated over the OCA2 layer such that the termination pads on the column film are bonded on top of the ACF on the flex-tails. As can be seen, the side of the film including the darkened coating is facing the glass of the touch surface (e.g. the user).

Top view 1620 shows a row film laminated over the OCA2 layer such that the termination pads 1625 on the column film are bonded on top of the ACF on the flex-tails.

Figure 17:
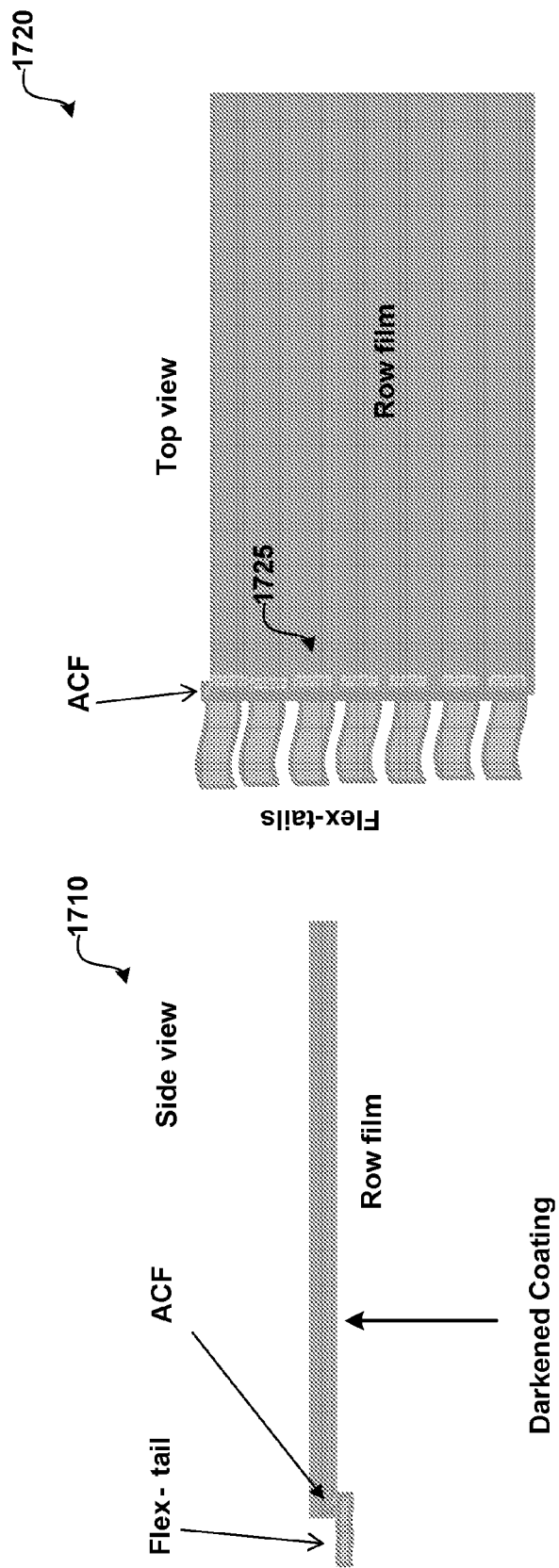
FIG. 17 shows flex-tails attached to a loose row film using ACF.

FIG. 17 shows flex-tails attached to a loose row film using ACF.

Side view 1710 shows flex-tails are attached to the loose row film using ACF. As illustrated, the row film has not yet been laminated. Tests, such as electrical continuity tests may be performed prior to lamination of the row film.

Top view 1720 shows flex-tails are attached to the loose row film including termination pads 1725 using ACF.

Figure 18:
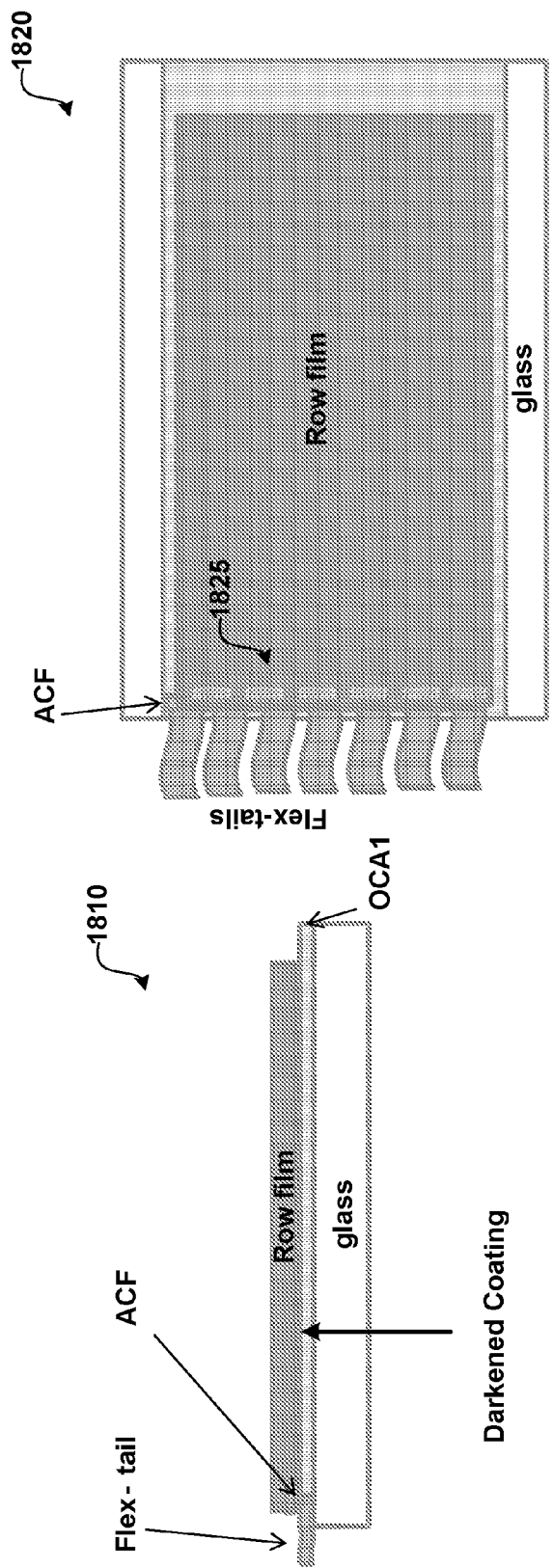
FIG. 18 illustrates row film laminated to an OCA layer that is laminated to a touch surface with the flex-tails already in place.

FIG. 18 illustrates row film laminated to an OCA layer that is laminated to a touch surface with the flex-tails already in place.

As illustrated, side view 1810 shows the row film that already includes the flex-tails in place laminated to OCA1 layer that is laminated to a glass touch surface. Since the flex-tails are already in place, the entire row film may be laminated to the OCA1 layer.

Top view 1820 shows that the row film 212 covers the OCA layer. As illustrated, termination pads 1825 are disposed near the left end of row film. The termination pads may be located in other positions (e.g. near the right end of the row film).

Figure 19:
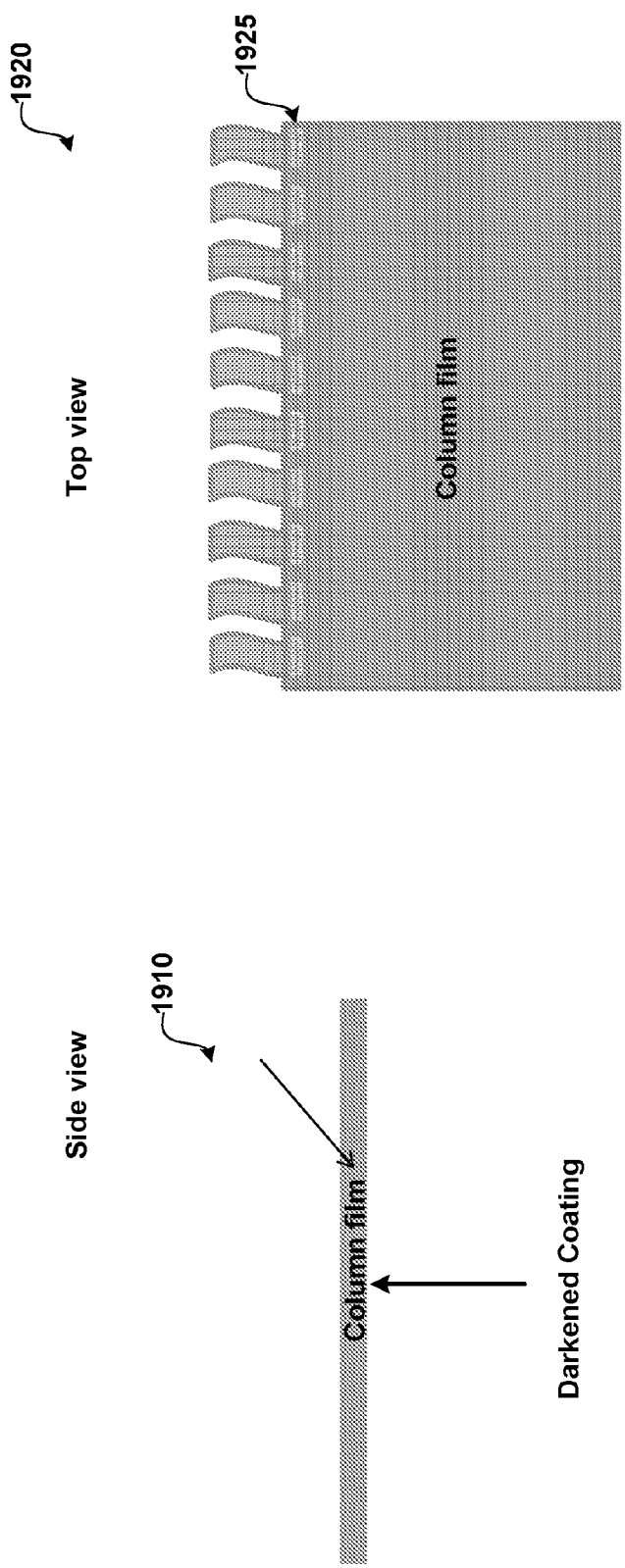
FIG. 19 shows flex-tails attached to a loose column film using ACF.

FIG. 19 shows flex-tails attached to a loose column film using ACF.

Side view 1910 shows the loose column film using ACF. As illustrated, the column film has not yet been laminated to anything. Tests, such as electrical continuity tests may be performed prior to lamination of the column film. As can be seen, the side of the film including the darkened coating is facing the glass of the touch surface (e.g. the user).

Top view 1920 shows flex-tails are attached to the loose column film including termination pads 1925 using ACF.

Figure 20:
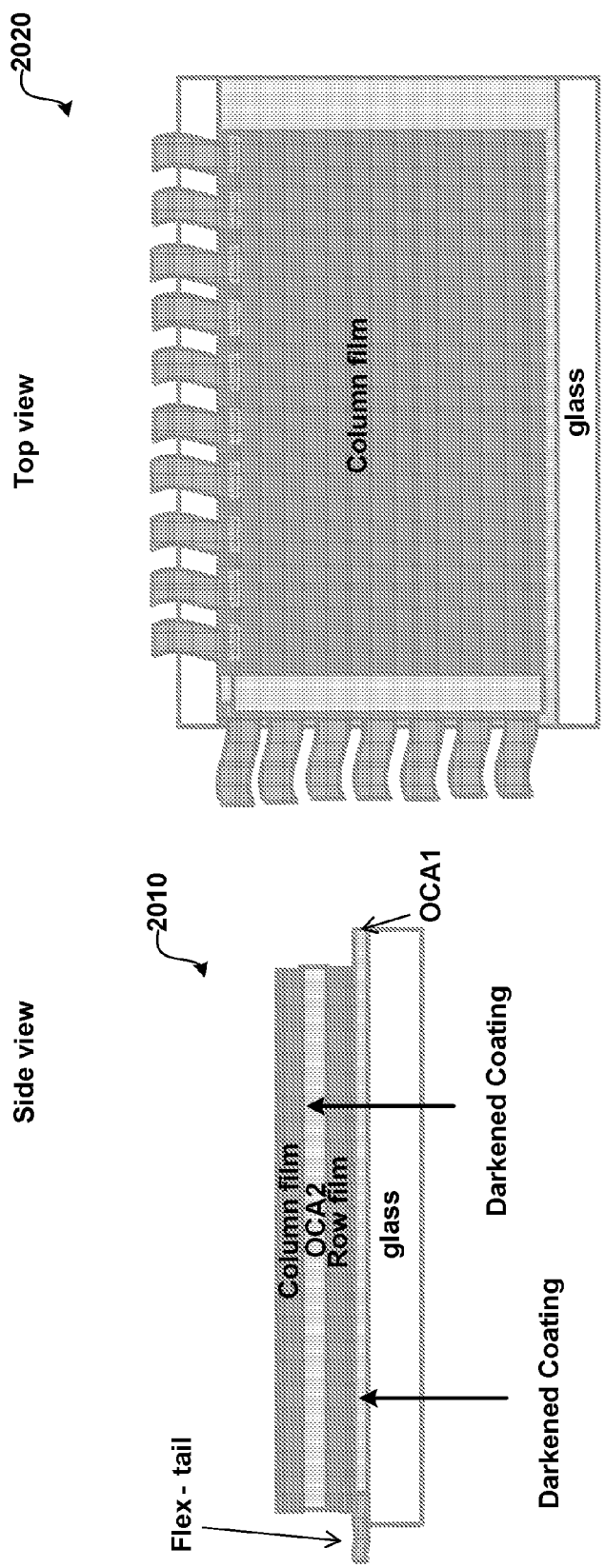
FIG. 20 illustrates column film laminated to an OCA layer that is laminated to the row film with the flex-tails already in place.

FIG. 20 illustrates column film laminated to an OCA layer that is laminated to the row film with the flex-tails already in place.

As illustrated, side view 2010 shows the column film that already includes the flex-tails in place laminated to OCA2 layer. Since the flex-tails are already in place, the entire column film can be laminated to the OCA2 layer. As can be seen, the side of the film including the darkened coating is facing the glass of the touch surface (e.g. the user).

Top view 2020 shows that the column film 212 covers the OCA2 layer. As illustrated, termination pads 1825 are disposed near the top end of the column film.

FIGS. 21-24 shows illustrative processes for laminating a dark film facing the touch surface of a touch sensor. While a specific order is shown, orderings of the operations may be changed according to various embodiments.

Figure 21:
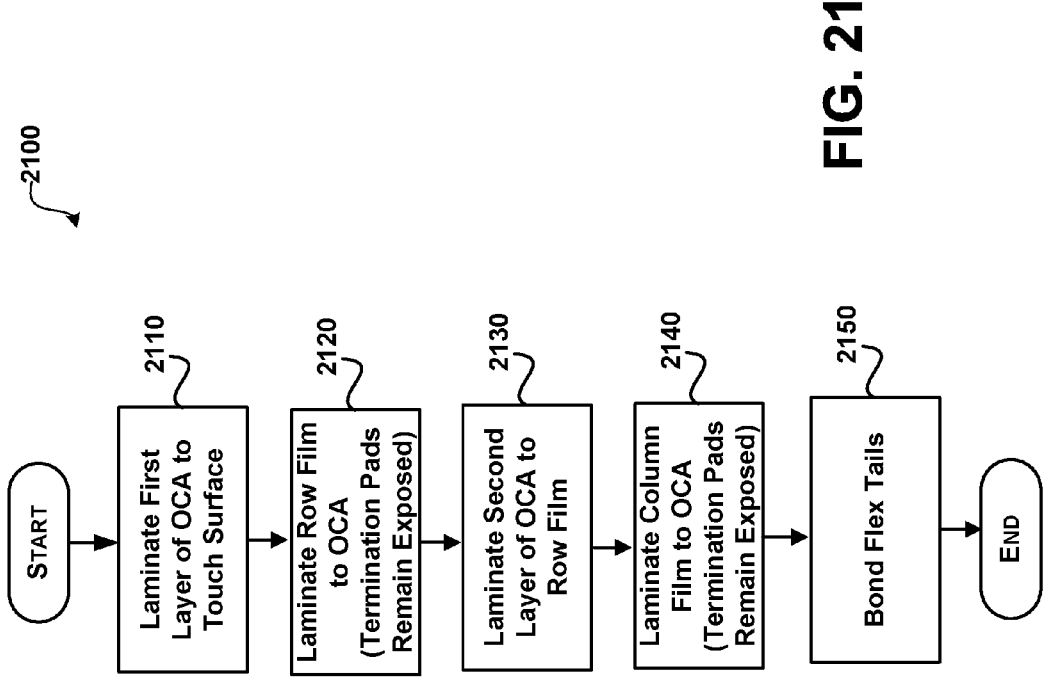
FIG. 21 shows a process for laminating a dark metalized film having termination pads to a touch surface with the dark surface facing the touch surface.

FIG. 21 shows a process for laminating a dark metalized film having termination pads to a touch surface with the dark surface facing the touch surface.

After a start operation, the process moves to operation 2110, where a first layer of Optically Clear Adhesive (OCA) layer is applied to a touch surface. The touch surface may be made from different materials. According to an embodiment, the touch surface is glass. The touch surface may be different thicknesses (e.g. depending on the application and/or type of device). For example, a glass touch surface may range from approximately 0.5 mm to over 3 mm. The OCA layer may cover all/portion of the touch surface. While an OCA layer is shown, other products, such as other types of adhesives may be used. The OCA layer may be a liquid OCA and/or an OCA tape.

Moving to operation 2120, a row film including termination pads is laminated to the OCA. The row film is laminated to the OCA such that the termination pads remain exposed and non-adhered to the OCA (e.g. so the non-adhered end can be peeled up). The metalized row film used in a touch sensor includes a darkened side that is directed at obscuring the wires that are disposed within the metalized film. According to an embodiment, both a row film and a column film are used within the touch sensor. According to another embodiment, a row and column film may be used. Different patterns of the layout of the wires within the row/column film may be used (e.g. parallel lines, diamond patterns, and the like). The darkened coating of the row film faces (e.g. is closest to) the touch surface.

Flowing to operation 2130, a second layer of OCA is laminated to the row film.

Transitioning to operation 2140, a column film including termination pads is laminated to the second OCA layer. The column film is laminated to the OCA such that the termination pads remain exposed and non-adhered to the OCA (e.g. so the non-adhered end can be peeled up). The metalized row film used in a touch sensor includes a darkened side that is directed at obscuring the wires that are disposed within the metalized film. The darkened coating of the column film faces the touch surface.

Flowing to operation 2150, flex-tails are bonded to the termination pads of the row and column film. For example, the side of the row film that is not adhered to the OCA layer may be peeled up and the termination pads bonded to the flex-tails. For example, an anisotropic conductive film (ACF) may be placed on the termination pads that is used for bonding. Other bonding methods may be used. Similarly, the side of the column film that is not adhered to the OCA layer may be peeled up and the termination pads bonded to the flex-tails.

The process then moves to an end operation.

Figure 22:
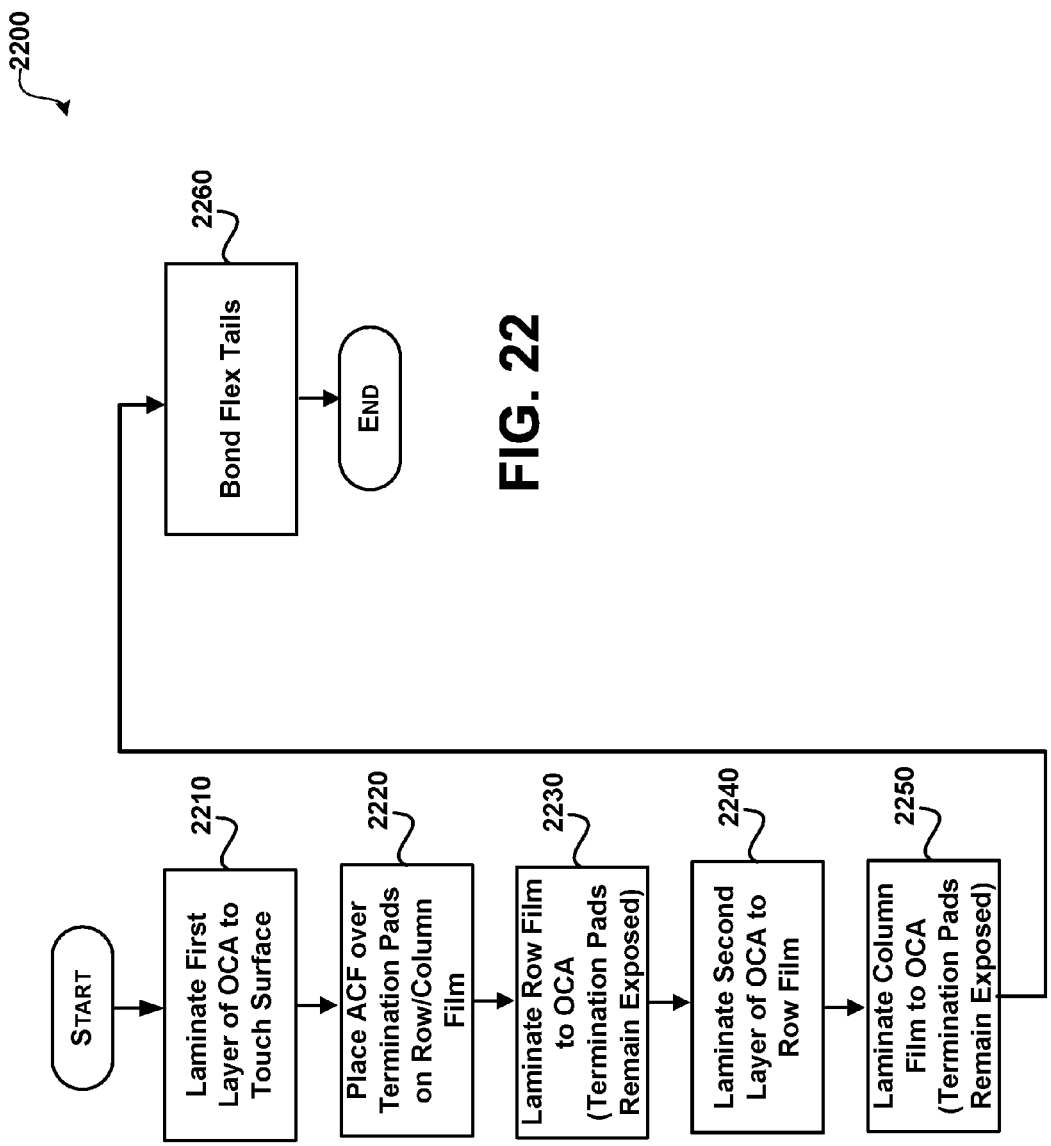
FIG. 22 shows a process for placing and anisotropic conductive film (ACF) on termination pads of a metalized film prior to lamination.

FIG. 22 shows a process for placing and anisotropic conductive film (ACF) on termination pads of a metalized film prior to lamination.

After a start operation, the process moves to operation 2210, where a first layer of Optically Clear Adhesive (OCA) layer laminated to a touch surface.

Moving to operation 2220, ACF is placed over the termination pads on the metalized film. According to an embodiment, a strip of ACF covers the row film termination pads on the row film and a strip of ACF covers the column film termination pads on the column film.

Flowing to operation 2230, the row film including the termination pads and ACF is laminated to the OCA. The row film is laminated to the OCA such that the termination pads and ACF remain exposed and non-adhered to the OCA (e.g. so the non-adhered end can be peeled up). The metalized row film includes a darkened side that faces the touch surface to help obscure the wires in the metalized film.

Flowing to operation 2240, a second layer of OCA is laminated to the row film.

Transitioning to operation 2250, the column film including the termination pads and ACF is laminated to the second OCA layer. The column film is laminated to the OCA such that the termination pads and ACF remain exposed and non-adhered to the OCA (e.g. so the non-adhered end can be peeled up). The metalized column film includes a darkened side that faces the touch surface to help obscure the wires in the metalized film.

Flowing to operation 2260, flex-tails are bonded to the termination pads of the row and column film. For example, the side of the row film that is not adhered to the OCA layer may be peeled up and the termination pads bonded to the flex-tails using the already placed ACF strips.

The process then moves to an end operation.

Figure 23:
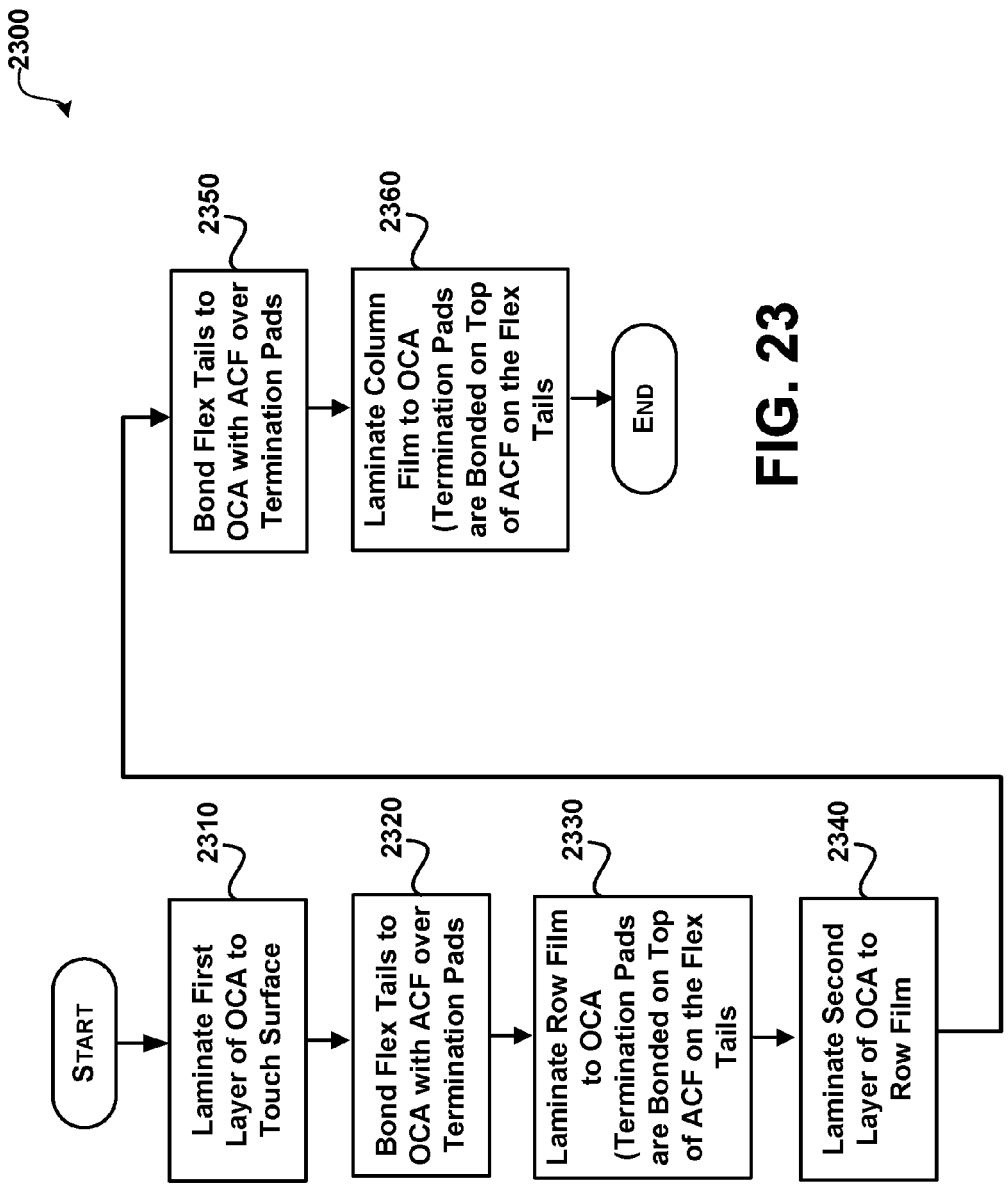
FIG. 23 shows a process for placing flex tails before lamination of a metalized film used in a touch sensor.

FIG. 23 shows a process for placing flex tails before lamination of a metalized film used in a touch sensor.

After a start operation, the process moves to operation 2310, where a first layer of Optically Clear Adhesive (OCA) layer is applied/laminated to a touch surface.

Moving to operation 2320, flex-tails with ACF are bonded to the OCA layer such that the flex-tails align with row termination pads.

Flowing to operation 2330, the row film including the termination pads is laminated to the OCA such that the termination pads of the row film are bonded to the ACF on the flex-tails. The metalized row film includes a darkened side that faces the touch surface to help obscure the wires in the metalized film.

Moving to operation 2340, a second layer of OCA is laminated to the row film.

Flowing to operation 2350, flex-tails with ACF are bonded to the second OCA layer such that the flex-tails align with column termination pads.

Transitioning to operation 2360, the column film including the termination pads is laminated to the OCA such that the termination pads of the column film are bonded to the ACF on the flex-tails. The metalized row film includes a darkened side that faces the touch surface to help obscure the wires in the metalized film.

The process then moves to an end operation.

Figure 24:
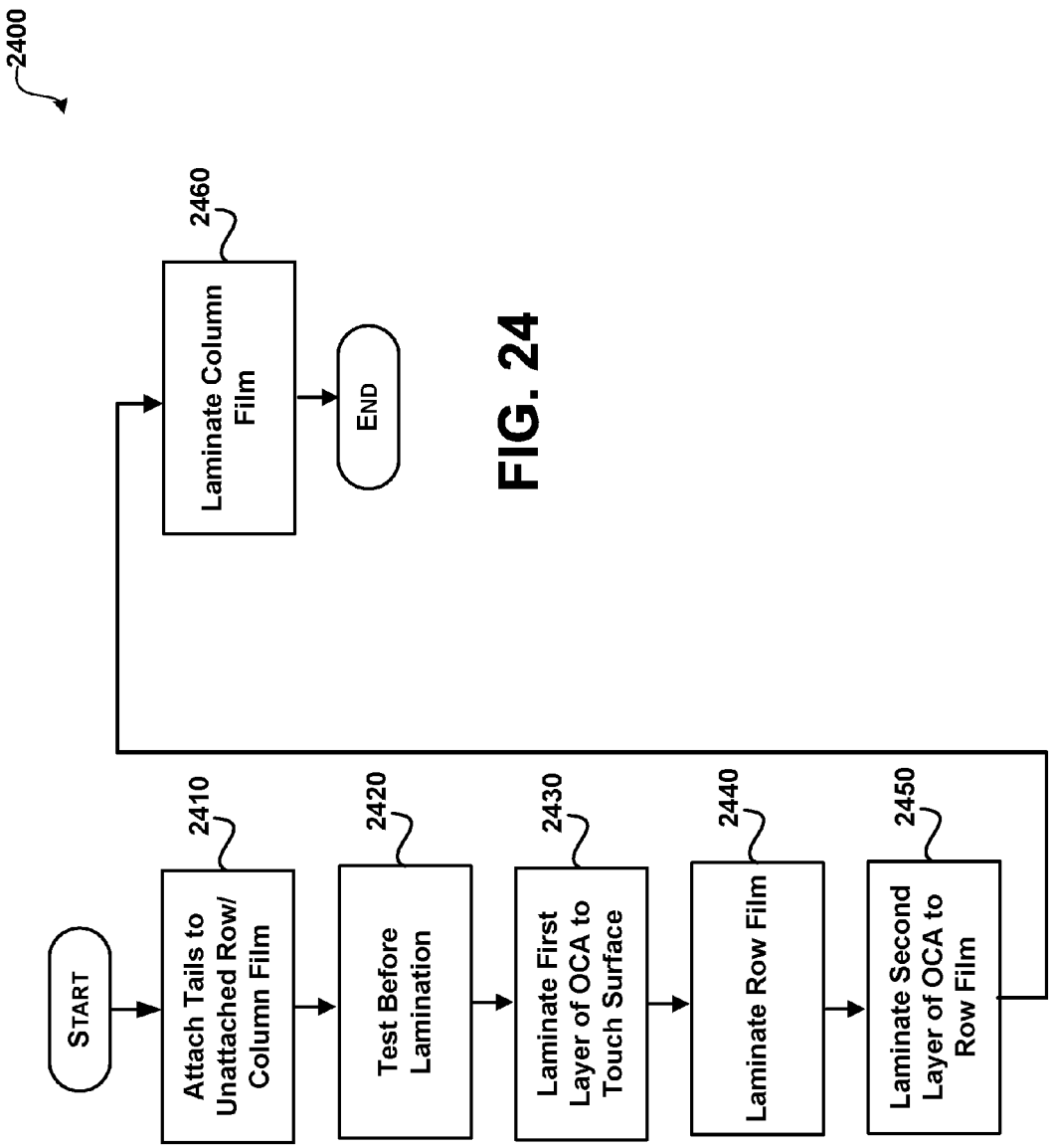
FIG. 24 shows a process for placing flex tails on a loose metalized film

FIG. 24 shows a process for placing flex tails on a loose metalized metalized film.

After a start operation, the process flows to operation 2410, where flex-tails with ACF are bonded to the metalized film such that the flex-tails align with the termination pads of the metalized film. According to an embodiment, flex-tails are bonded to a row film including row termination pads and flex tails are bonded to a column film including column termination pads.

Moving to operation 2420, the metalized film(s) may be tested (e.g. for electrical continuity) before being laminated (e.g. to a touch surface).

Flowing to operation 2430, a first layer of Optically Clear Adhesive (OCA) layer laminated to a touch surface.

Transitioning to operation 2440, the row film including the flex-tails already bonded is laminated to the OCA. The row film may be laminated completely without leaving a portion of the film un-adhered since the flex-tails are already in place. The metalized row film includes a darkened side that faces the touch surface to help obscure the wires in the metalized film.

Moving to operation 2450, a second layer of OCA is laminated to the row film.

Flowing to operation 2460, the column film including the flex-tails already bonded is laminated to the second OCA layer. The column film may be laminated completely without leaving a portion of the film un-adhered since the flex-tails are already in place. The metalized row film includes a darkened side that faces the touch surface to help obscure the wires in the metalized film.

The process then moves to an end operation.

The embodiments and functionalities described herein may operate via a multitude of computing systems including, without limitation, displays with touch screens, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a display with a touch sensor 1130 as described herein. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 25:
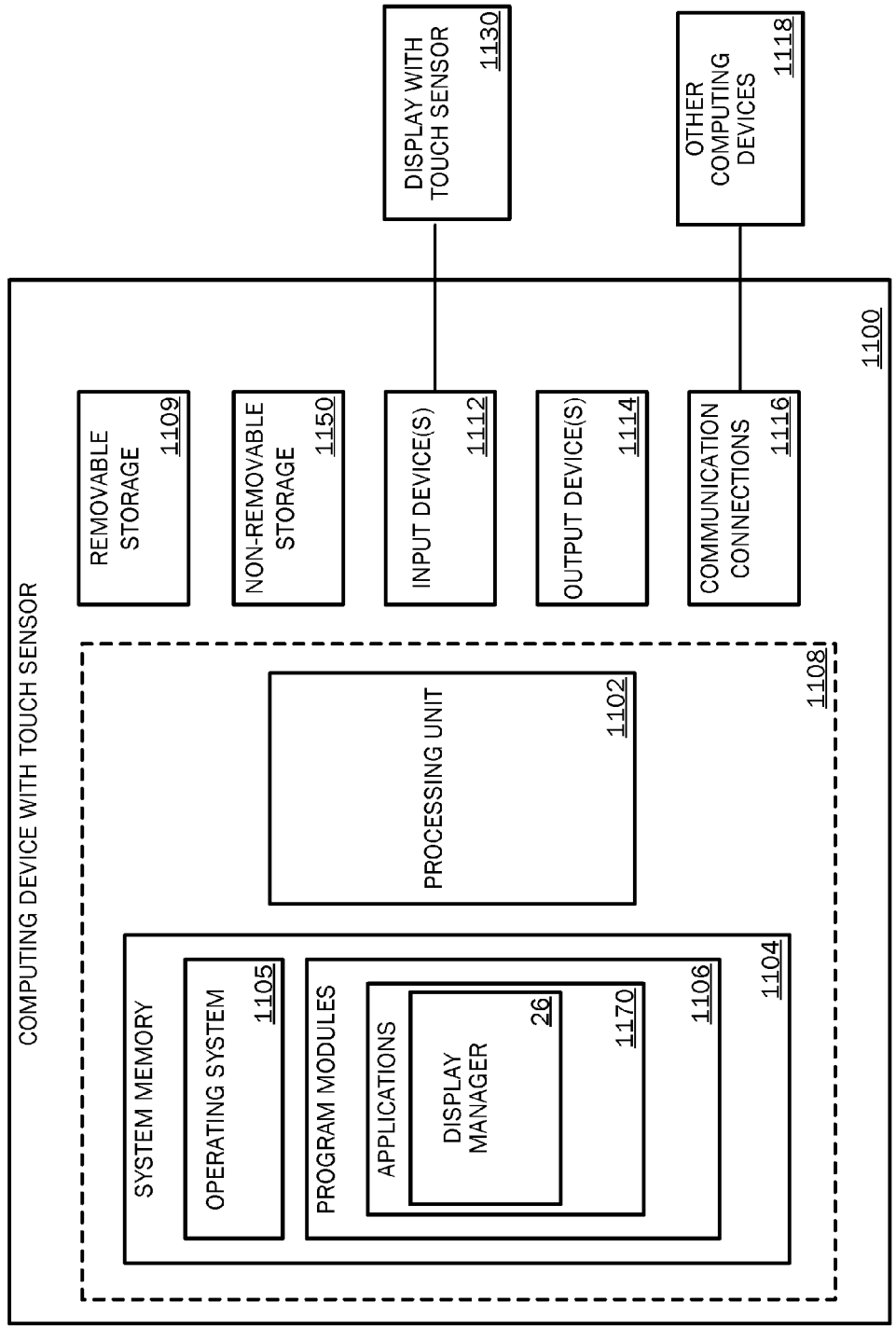
FIG. 25 provides a discussion of an operating environment in which embodiments of the invention may be practiced.

FIG. 25 provides a discussion of an operating environment in which embodiments of the invention may be practiced. The description is for purposes of example and illustration and are not limiting of a vast number of computing device configurations that may be utilized for practicing embodiments of the invention, described herein.

FIG. 25 is a block diagram illustrating physical components (i.e., hardware) of a computing device 1100 including one or more touch sensors with which embodiments of the invention may be practiced. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1170 such as the display manager 26. The display manager 26 is configured to process touch input received from touch sensor 1130. The operating system 1105, for example, may be suitable for controlling the operation of the computing device 1100. Furthermore, embodiments of the invention may be practiced in conjunction with a graphics library, other operating systems, or any other application program and is not limited to any particular application or system. This basic configuration is illustrated in FIG. 25 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 25 by a removable storage device 1109 and a non-removable storage device 1150.

As stated above, a number of program modules and data files may be stored in the system memory 1104. While executing on the processing unit 1102, the program modules 1106 (e.g., the display manager 26) may perform processes including, but not limited to, processing touch input received from one or more touch sensors. Other program modules may be used in accordance with embodiments of the present invention.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 25 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the display manager 26 may be operated via application-specific logic integrated with other components of the computing device 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1100 may also have one or more input device(s) 1112 such as a touch sensor 1130, a keyboard, a mouse, a pen, a sound input device, etc. While touch sensor 1130 is shown outside of computing device 1100, display and/or touch sensor 1130 may be included within computing device 1100. The output device(s) 1114 such as a display, speakers, a printer, etc. may also be included. The aforementioned devices are examples and others may be used. The computing device 1100 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1150 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A touch sensor, comprising:
   a touch surface;
   a first Optically Clear Adhesive (OCA) layer laminated to the touch surface, wherein the first OCA layer is shorter than the touch surface in one direction;
   a row film including row termination pads on a row end that are bonded to flex-tails that is laminated to the first OCA layer such that a darkened surface of the row film faces the touch surface, wherein the row film end extends outward in the one direction from the first OCA layer and overhangs the touch surface to define a gap between the row end of the row film and the touch surface for receiving the row termination pads bonded to the flex-tails and an Anisotropic Conductive Film (ACF) in the gap, wherein the ACF covers the row film termination pads prior to lamination, wherein the row end of the row film including the row termination pads and the flex-tails are non-adhered to the first OCA layer such that the row termination pads are exposed in the gap after the row film is laminated to the first OCA layer, and wherein the darkened surface is applied to a side of the row film where the row termination pads are bonded to the flex-tails;
   a second Optically Clear Adhesive (OCA) layer laminated to the row film, wherein the second OCA layer is shorter than the touch surface in an another direction, the one direction and the another direction being different; and
   a column film including column termination pads on a column end bonded to column flex-tails that is laminated to the second OCA layer, wherein the column end extends outward in the another direction.

2. The touch sensor of claim 1, wherein the touch surface is glass and the darkened surface is applied to a side of the column film where column termination pads are bonded to the flex-tails.

3. The touch sensor of claim 2, wherein a portion of the column end of the column film including the column termination pads extends outward in the another direction from the second OCA layer and is non-adhered to the second OCA layer such that the column termination pads are exposed in another gap after the column film is laminated to the second OCA layer.

4. The touch sensor of claim 1, wherein an Anisotropic Conductive Film (ACF) covers the column film termination pads prior to lamination.

5. The touch sensor of claim 1, wherein the flex-tails are bonded to the row film termination pads and to the column film termination pads after the row film is laminated and the column film is laminated.

6. The touch sensor of claim 1, wherein the flex-tails are attached to the row film before the row film is laminated to the first OCA layer.

7. A method for laminating layers of a touch sensor, comprising:
   providing a touch surface;
   applying a darkened surface to a metalized film of the touch sensor facing the touch surface;
   covering termination pads with Anisotropic Conductive Film (ACF) prior to lamination;
   laminating a first Optically Clear Adhesive (OCA) layer to the touch surface, wherein the first OCA layer is shorter than the touch surface in one direction;
   bonding flex-tails to termination pads of the metalized film used in the touch sensor prior to laminating the metalized film to the OCA layer such that a portion of the metalized film extends outward in the one direction from the first OCA layer;
   defining a gap between the outwardly extending portion of the metalized film and the touch surface when laminating the metalized film to the OCA layer for receiving the row termination pads and the ACF in the gap; and
   exposing the termination pads in the gap after the metalized film is laminated as a result of the outwardly extending portion of the metalized film including the termination pads and the flex-tails not adhering to the first OCA layer.

8. The method of claim 7, wherein bonding the flex-tails to termination pads of metalized film used in the touch sensor prior to laminating the metalized film comprises bonding the flex-tails to row termination pads of a row metalized film and bonding the flex-tails to column termination pads of a column metalized film.

9. The method of claim 7, further comprising testing the metalized film including the flex-tails before laminating the metalized film to the touch surface.

10. An apparatus, comprising:
    a glass touch surface;
    a first Optically Clear Adhesive (OCA) layer laminated to the touch surface, wherein the first OCA layer is shorter than the touch surface in one direction;
    a first metalized film including termination pads on a first end that are bonded to flex-tails that is laminated to the first OCA layer such that a darkened surface of the first metalized film faces the touch surface, wherein the first end extends outward in the one direction from the first OCA layer and overhangs the glass touch surface to define a gap between the first end of the first metalized film and the glass touch surface for receiving the termination pads bonded to the flex-tails and an Anisotropic Conductive Film (ACF) in the gap, wherein the ACF covers the termination pads prior to lamination, wherein the first end of the first metalized film including the termination pads and the flex-tails are non-adhered to the first OCA layer such that the termination pads are exposed in the gap after the first metalized film is laminated to the first OCA layer, and wherein the darkened surface is applied to a side of the first metalized film where the termination pads are bonded to the flex-tails;
    a second Optically Clear Adhesive (OCA) layer laminated to the first metalized film, wherein the second OCA layer is shorter than the touch surface in another direction, the one direction and the another direction being different; and
    a second metalized film including termination pads on a second end bonded to flex-tails that is laminated to the second OCA layer, wherein the second end extends outward in the another direction.

11. The apparatus of claim 10, wherein the darkened surface is applied to a side of the second metalized film where termination pads are bonded to the flex-tails.

12. The apparatus of claim 10, further comprising: a display that is coupled to the touch sensor.

13. The apparatus of claim 10, further comprising: a processor that is configured to process touch input received from the touch sensor.

14. The apparatus of claim 10, wherein the first metalized film is a row film and the second metalized film is a column film.

\* \* \* \* \*